Figure 1:
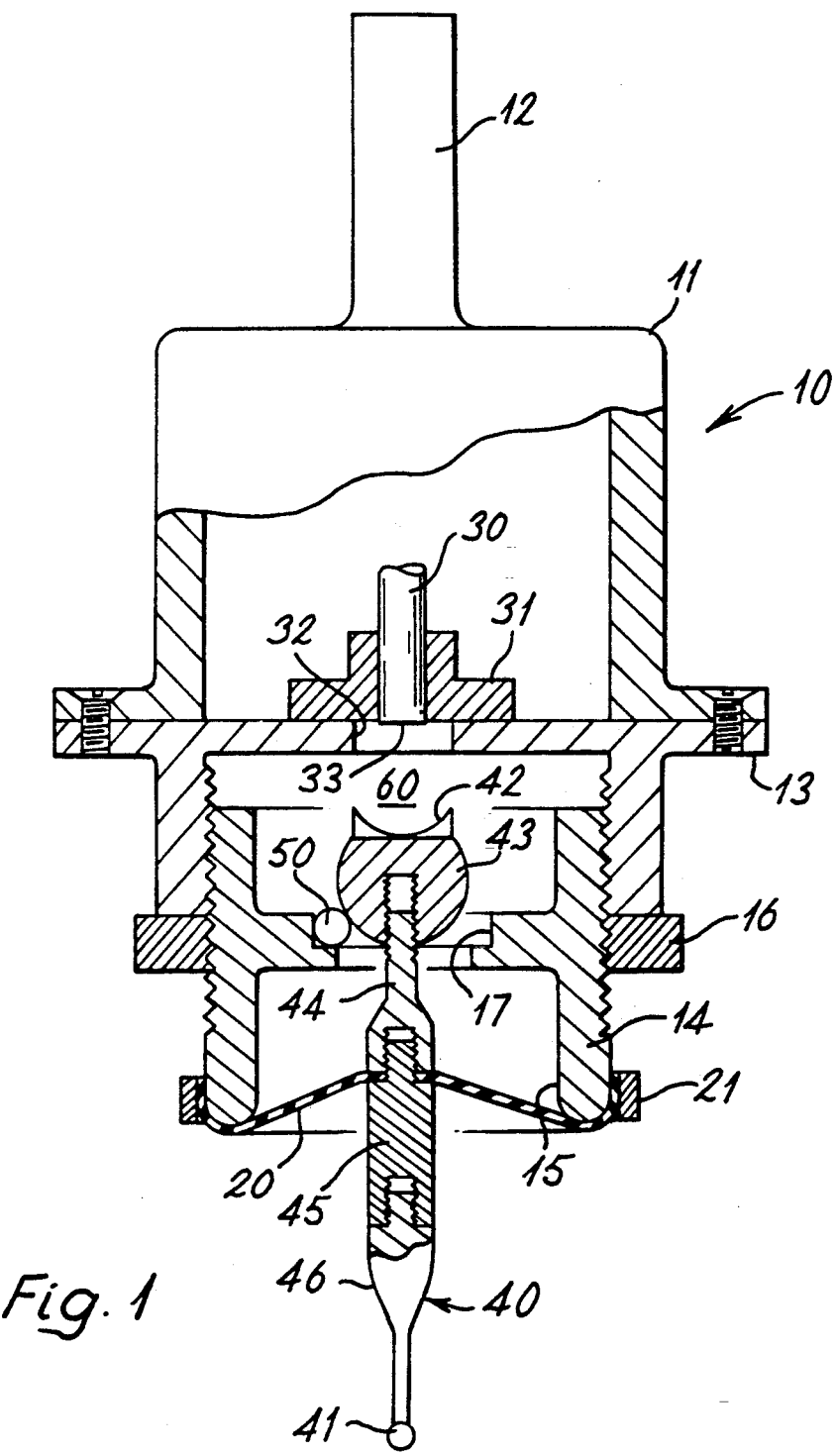

United States Patent [19]

Butler

[11] Patent Number: 5,222,304
[45] Date of Patent: Jun. 29, 1993

[54] PROBES

[75] Inventor: Clive Butler, Kings Langley, England

[73] Assignee: British Technology Group Limited, London, England

[21] Appl. No.: 635,585

[22] PCT Filed: Jul. 4, 1989

[86] PCT No.: PCT/GB89/00755
§ 371 Date: Feb. 6, 1991
§ 102(e) Date: Feb. 6, 1991

[87] PCT Pub. No.: WO90/00717
PCT Pub. Date: Jan. 25, 1990

[30] Foreign Application Priority Data

Jul. 5, 1988 [GB] United Kingdom ............... 8815984

[51] Int. Cl.⁵ .................... G01B 5/20; G01B 11/24
[52] U.S. Cl. .................................. 33/561; 33/558
[58] Field of Search ............... 33/556, 558, 559, 561

[56] References Cited

U.S. PATENT DOCUMENTS

| | | | |
|---|---|---|---|
| 4,158,768 | 6/1979 | Lavelli | 250/202 |
| 4,177,568 | 12/1979 | Werner et al. | 33/561 |
| 4,513,507 | 4/1985 | Laskowski | 33/558 |
| 4,523,382 | 6/1985 | Werner et al. | 33/556 |
| 4,532,713 | 8/1985 | Feichtinger | 33/559 |
| 4,995,170 | 2/1991 | Brule et al. | 33/200 |

FOREIGN PATENT DOCUMENTS

| | | |
|---|---|---|
| 23549 | 2/1981 | European Pat. Off. . |
| 8222757 | 12/1986 | Fed. Rep. of Germany . |
| 2365408 | 4/1978 | France . |
| 2384230 | 10/1978 | France . |

OTHER PUBLICATIONS

Dr. Derek Smith, "Probing Errors of a CMM", *Quality Today*, Feb. 1988, p. 56.
Patent Abstracts of Japan, vol. 8, No. 144, (p-284) (1581), Mar. 1984.
Patent Abstracts of Japan, vol. 10, No. 322, (P-511)(2378) Jun., 1986.

*Primary Examiner*—Thomas B. Will
*Attorney, Agent, or Firm*—Cushman, Darby & Cushman

[57] ABSTRACT

A probe for position-determining apparatus and the like has a housing (10) and in the housing a sensing space (60) and an aperture (915) to the sensing space, a stylus (40) extending out of the sensing space through the aperture, a low-friction stylus support (50;17) around the aperture, a resilient element (20;120) for constraining the stylus on to the support and generally towards a neutral axis while permitting position-determining displacement on the support against the constraining element, which is outside the sensing space, while in the sensing space is a sensing arrangement (30, 42; 30, 42, 35, 37) separate from the constraining element to sense directly significant movement of the stylus from the neutral axis without contact with the stylus and to indicate such significant movement of the stylus as a position-determining displacement.

15 Claims, 4 Drawing Sheets

PROBES

This invention relates to probes, such as are used with co-ordinate measuring and similar machines, to indicate a touch to an object.

In co-ordinate measuring and similar machines an object is measured by relative motion of a probe and an object in a controlled manner, usually from a datum, until a "touch" on the object is indicated by the probe. The co-ordinates of the touch position are recorded. By repeated such actions the dimensions of the object can be determined.

The aim of such measurements is to achieve precision to better than one micron with a repeatability of half a micron or less. Accordingly it is clear that the "touch" action must be very responsive and free from error. Probes to achieve such touch action usually use a light, thin stylus with a ball-end of hard material to touch the object. The touch action deflects the stylus in a mounting in the probe and the occurrence of the deflection of the stylus is sensed to cause the co-ordinates to be recorded.

Known probes provide good results in many measurements but in some measurements errors can arise which cannot be compensated by corrections to the recorded co-ordinates. One cause for such errors can be that deflections of the stylus in different directions require different amounts of deflection before sensing occurs. Another cause can be that an electromechanical switch operated by the stylus is used for the sensing action and the making or breaking of the switch is not consistent because of arcing or corrosion at the switch contacts. Probes used hitherto have electrical or mechanical connections to the stylus.

Furthermore the probes require precision mechanical engineering manufacturing techniques which are expensive, resulting in a high cost for a probe. Also such a probe can easily be damaged by excess load on the stylus. Various of the problems with present probes are discussed in articles in Quality Today, February 1988, page 56 and May 1988, page 22.

It is an object of this invention to provide a probe which overcomes such shortcomings.

According to the invention there is provided a probe for position-determining apparatus and the like having a housing and in the housing a sensing space and an aperture to the sensing space, a stylus extending out of the sensing space through said aperture, a low-friction stylus support means around said aperture, means for constraining said stylus on to said support means and generally towards a neutral axis while permitting position-determining displacement on said support means against said constraining means, characterised in that said constraining means is outside said sensing space and that in said sensing space is a sensing means separate from the constraining means to sense directly significant movement of the stylus from said neutral axis without contact with the stylus and indicate said significant movement of the stylus as a position-determining displacement.

Conveniently the low-friction stylus support is a plurality of balls spaced around the aperture and the stylus has a surface at least partly-spherical to move on said support. The stylus thus pivots about a point which is the centre of curvature of the part-spherical surface. The constraining means may be a resilient, flexible element such as a sheet of rubber.

Preferably the sensing means includes in said sensing space a source of light directed towards the stylus and the stylus carries a mirror to reflect light from the source back to the sensing means. The amount of light received by the sensing means from the mirror varies in dependence on the displacement of the stylus. The mirror is preferably concave. The source of light may be one end of a flexible fibre optic extending from a radiator of light at the other end of the fibre optic remote from the probe. The light reflected by the stylus mirror may be collected by the or another fibre optic and carried to means to detect a change in the amount of light collected. The sensing means may include means to compare the amount of light radiated from the radiator and the amount collected and determine, subject to compensation for the amount actually radiated, a change in the amount collected resulting from significant movement of the stylus.

In one useful arrangement the stylus may have a disc-shaped, knife-edged part to touch an object to be measured.

Preferably the significant movement of the stylus is that to displace to said neutral axis the part of the stylus in contact with an object to be measured.

Figure 1A:
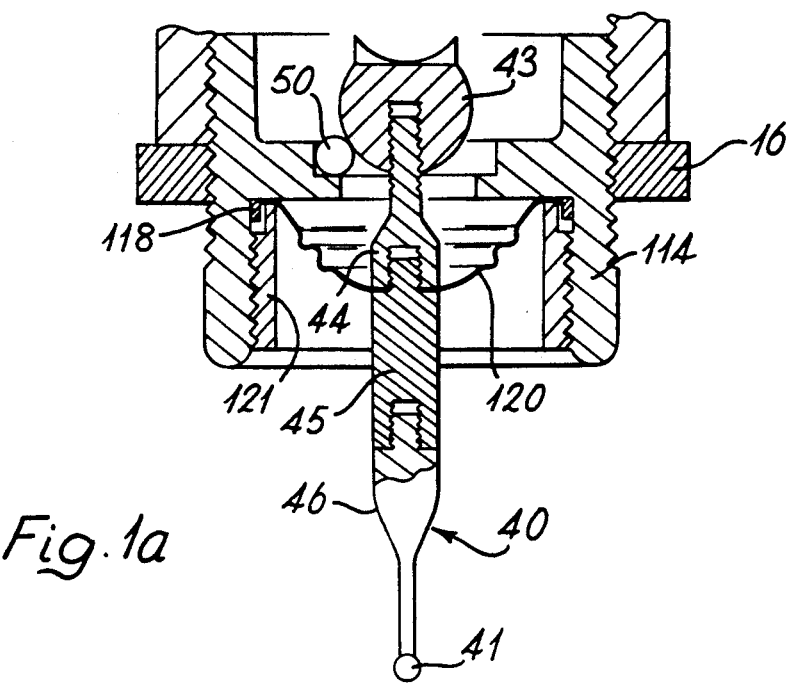
Figure 1B:
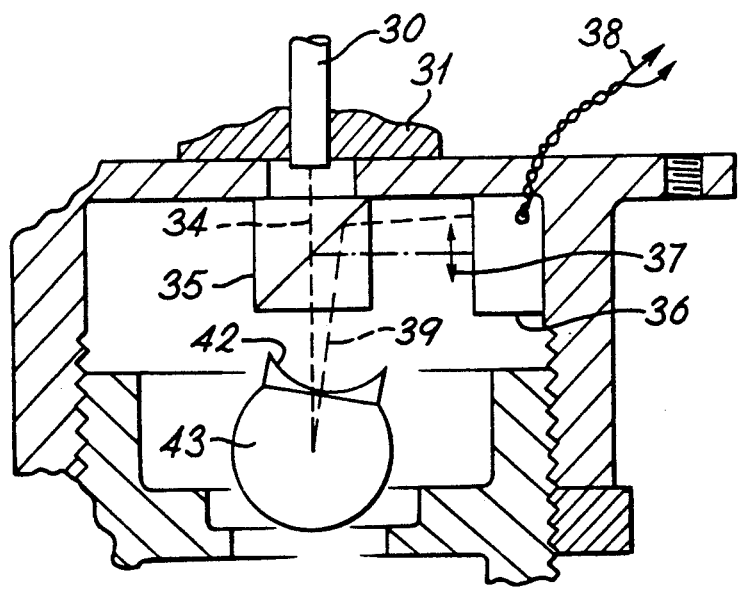
Figure 2:
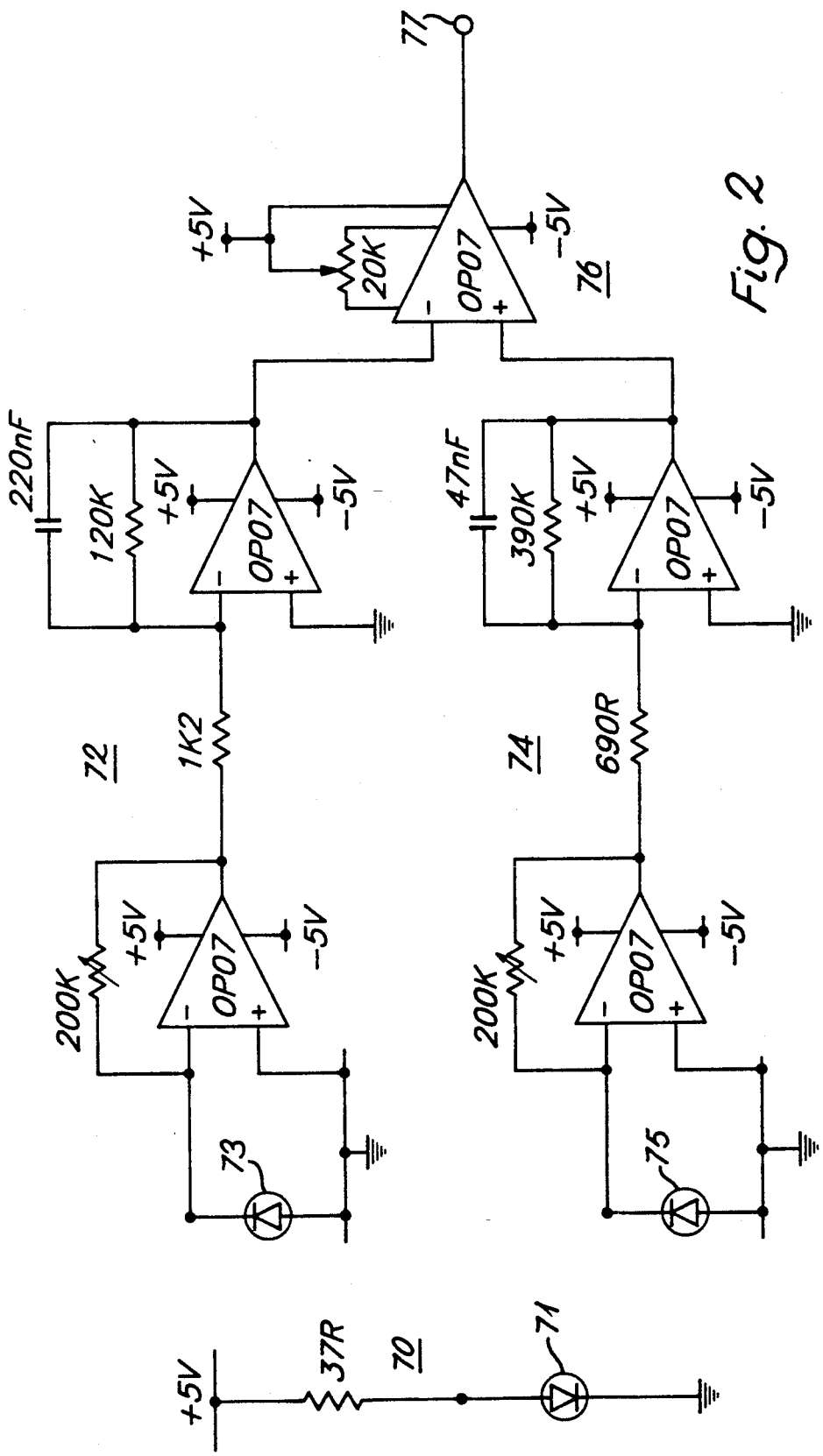
Figure 3:
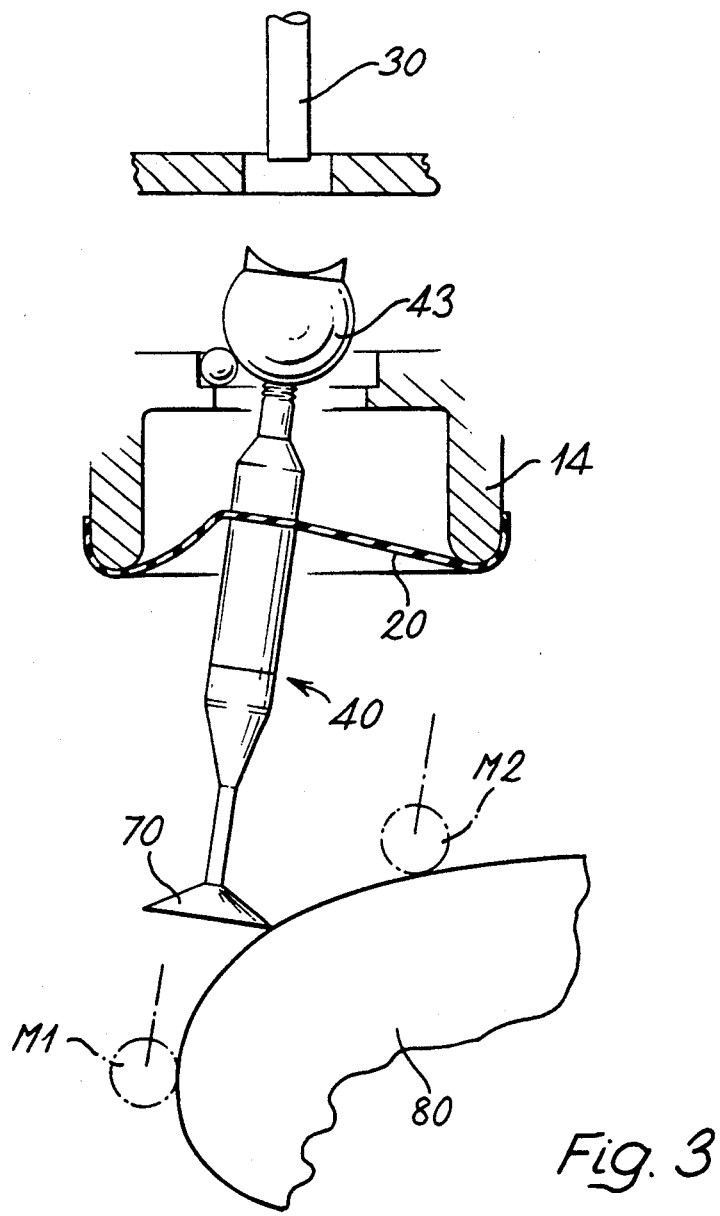

Embodiments of the invention will now be described with reference to the accompanying drawings, in which:

FIGS. 1, 1a, 1b show in schematic cross-section a probe and variants thereof embodying the invention, FIG. 2 shows in outline an optoelectronic circuit diagram for the probe, and FIG. 3 shows a stylus for the probe.

Referring to FIG. 1 this shows a housing, indicated generally at 10, and including a body 11 with a mounting shank 12, and a cover 13 threaded internally to receive a stylus carrier 14, secured by a lock-ring 16. Inside the housing is a sensing space 60. The stylus carrier 14 has an aperture 15 across which a resilient flexible element 20, for example thin rubber sheet, is secured by a retainer 21. The stylus, indicated generally at 40, passes through and is connected to the element 20, conveniently by means of screwed-together parts 44 and 45 which grip the element, and has at the inner end, within sensing space 60, a mirror 42 which is preferably concave. The mirror is conveniently on a part-spherical portion 43 of the stylus, which portion rests on a low-friction support conveniently formed by three balls, one only being shown at 50, seated in a ball seat 17 formed in stylus carrier 14. The flexible element forms a seal for the aperture.

A fibre optic 30 is mounted on cover 13 by a suitable element 31 and the end of fibre optic 30 is exposed to mirror 42 through a window 32 in cover 13.

In the undeflected, neutral, position of the stylus the end 33 of the fibre optic is on the longitudinal neutral axis of the probe and concave mirror 42 is also on this axis. The resilient flexible element 20 is preferably evenly stressed when the stylus is undeflected. The resilient flexible element exemplifies means to constrain the stylus on to the low-friction support and towards the neutral axis, permitting displacement on the support and returning the stylus towards the neutral axis after deflection.

Approximate dimensions of one example of the probe, given by way of non-limiting example, are as follows, using the reference numerals of FIG. 1:

| | |
|---|---|
| portion 43 | 13 millimeter diameter |
| balls 50 | 4 millimeter diameter |
| aperture 15 | 30 millimeter diameter |
| portion 43 - element 20 | 9 millimeters approximately. |

It is of course possible to make probes of smaller dimension which embody the invention. Other constructional details, suitable material and shielding from stray light will be readily apparent to those skilled in the art.

The action of the probe is as follows. Light from the fibre optic end 33 is directed along the above-mentioned undeflected longitudinal, neutral, axis towards the mirror 42 for incidence thereon. In the undeflected position of the stylus the light from fibre optic end 33 is reflected back to the fibre optic end 33 and returns along the fibre optic. By suitable techniques well-known in the art, such as beam-splitting, the light reflected from the mirror can be compared with the light incident thereon in suitable optoelectronic means or like comparator. As the stylus is deflected from the neutral axis the part-spherical portion 43 turns about its centre of curvature by moving over the balls 50, being constrained against the balls by the constraining means 20. The mirror moves with portion 43 and the light reflected by the mirror is directed away from fibre optic end 33. The amount of reflected light returning along the fibre optic is reduced and by suitable means a signal indicating that a reduction has occurred is produced by the comparator. When the cause of deflection is removed the constraining means such as resilient flexible element 20 restores the stylus towards the undeflected position.

From the description set out above it will be apparent that the probe embodying the invention is of much simpler construction than those known hitherto and the sensing of the occurrence of stylus displacement does not rely on electromechanical switching nor is the sensing action affected by the direction of stylus deflection.

However various further advantages are also provided by the invention as will now be detailed.

The comparator means is preferably arranged to indicate that a reduction in reflected light has occurred only when a significant reduction to a predetermined level has occurred.

conveniently this predetermined reduction is that which occurs when the ball 41 on the stylus is deflected by contact with a body so that the contact point on the ball 41 is on the neutral axis mentioned above.

A further advantage of this arrangement is that the stylus does not have to be returned exactly to the neutral axis position by the action of constraining means 20. Provided the stylus is returned close enough to the neutral axis to reflect light to above the predetermined level the next measurement will be accurate.

If required the light supplied for radiation by fibre optic 30 can be monitored to ensure that compensation for any changes in the radiated level can be made when determining that the predetermined reduction has occurred by movement of the stylus, and thus of the mirror 42.

The preferred optical arrangement is for the centre of curvature of the mirror to be at the surface 33 of the fibre optic 30 and for the mirror to be a part-spherical concave reflecting surface large enough to contain as much as possible of the light output from the fibre optic (in the neutral axis position). In one example, where the fibre has a numerical aperture of 0.47, the radius of curvature of the mirror is r and the diameter of the part-spherical portion d the relation d=0.94r applies. The coefficient of r is actually twice the value of the arc sin of the numerical aperture. A fibre optic diameter in the order of one millimetre is found to be convenient as this larger size reduces alignment problems. Light can be supplied to fibre optic 30 by an infra-red (about 950 nanometres) LED, essentially of conventional form but modified by grinding away the diffuser lens to increase the transfer to the fibre optic. The LED is conveniently some distance from the probe, for example at the other end of about one metre of fibre optic 30. The light supplied to the fibre optic can be monitored by another fibre optic which picks up the light from the rear of the LED.

The proper operation of the optical system is ensured by causing the part-spherical portion 43 to be kept in contact with the three balls 50, which are equally spaced in the stylus carrier 14, by the action of the constraining means such as resilient flexible element 20 which is under a certain tension by the connection to the stylus drawing the element into carrier 14 even when the stylus is on the neutral axis. In this way the part-spherical portion 43 also moves about the centre of the spherical surface of the portion.

Wear and friction should be prevented, thus the balls 50 can be of stainless steel or other hard material such as ruby or tungsten carbide and highly spherical. Similarly portion 43 can be formed from a phosphor bronze, stainless steel or above hard material ball which is highly spherical. The fibre 30 and element 20 are preferably adjustable for the accurate setting up of the device.

FIG. 2 shows a circuit for one form of optoelectronic circuit to form the comparator and produce an output trigger signal on the predetermined reduction of reflected light. Careful electrical screening is needed to avoid spurious results. Those skilled in the art will understand from the circuit the requirements for the comparator. In brief there is a light source 70 which includes an infra-red LED 71 to supply light to fibre optic 30. The light supplied to the fibre optic 30 is monitored by circuit 72, which includes photodiode 73 to respond to the light from LED 71. Light reflected from mirror 42 to return along the fibre optic 30 is responded to by photodiode 75 of circuit 74. The outputs of circuit 72 and circuit 74 are compared in circuit 76 to give an output signal for use at terminal 77, for example as a trigger signal for the coordinate measuring machine.

The deflection of the reflected light can also be detected by using a fibre optic with a core of fibres along which light is supplied and an outer layer of fibres along which light deflected light is returned to a detector.

In certain conditions a flexible element of rubber or like material can be degraded or exhibit hysteresis. To avoid these problems an element of thin metal can be used. FIG. 1a shows the form of the relevant part of FIG. 1 when such a metal element is used as the constraining means.

The stylus carrier 114 is threaded internally to receive a threaded retainer 121 which secures a constraining means of a metal diaphragm/spring element 120 in place. The stylus is conveniently connected to the element as before by the screwed together parts 44 and 45.

A seat 118 is provided to define the diameter of the element 120 when installed. The element 120 has to be "dished" a little to be inserted into seat 118. This "dishing" produces a stress in the element which is used to constrain the stylus against the low-friction support 50.

Conveniently the element is corrugated, for example with concentric zones. The element may be "dished" by forcing it into seat 118 the element being slightly oversize for the seat.

When a magnetic field constraining means is used this may be formed by one or more permanent magnets inside aperture 15 on the stylus part 44 and an energisable coil arranged circumferentially around the inside of aperture 15. The energisation of the coil can be adjustable overall or locally to produce required forms of constraining action. A membrane between the stylus and the carrier 14 can be used to provide a seal and, if required, auxiliary positioning.

As described above the sensing means is conveniently arranged to provide a "switching" output which changes state only after a certain amount of stylus movement. If required the output can vary to show the amount of movement, i.e. an analog output. FIG. 1b shows one arrangement. A beam splitter 35 is placed in the light path 34 from fibre optic 30. Light reflected from mirror 42 is deflected from the line of light path 34 and then by the beam splitter, e.g. as shown at 39, to fall on a detector 36 which can identify the position of the deflected beam. A detector array or other device can be used to indicate the movement of the beam along the arrow 37. The output of the detector 36 is available over connection 38. This arrangement provides for monitoring of the probe position in the X-Y plane, e.g. for rapid scanning of surfaces and measurement when the coordinate measuring machine is stationary with the probe resting on a surface and can provide higher precision measurement.

A "trigger" arrangement can respond to the detector output to stop the measurement machine and read the data.

Analog measurement can be made after the measurement machine has stopped, so avoiding vibration problems. Analog measurement can reduce the performance required from the stylus restoring technique.

It is preferable that the fibres be arranged as described above but other arrangements are possible. For example the fibre supplying light can be on the axis and the receiving fibre alongside. Any "lobing" in the sensing pattern can be predicted and compensated for in electronic circuitry processing the electrical output produced by the reflected light.

An important advantage of the probes embodying the invention is that the switching action on the stylus being displaced is a "clean" fast one as no mechanical switch elements are involved. Light (be it infra-red, visible or ultra-violet) is described for the radiation used to detect mirror, and therefor stylus, movement but other radiation could be used with appropriate adaption, even variation of electrical capacitance may be possible. Light is convenient as it is relatively easily focussed and reflected and exemplifies the higher speed of use, lower stylus force and cleaner switching action achieved by removing the existing mechanical switch.

The absence of the need to return the stylus to an exact axial position is also helpful, the constraining means such as the resilient flexible element not having to have particularly high standards of precision provided it is adequate to return the mirror to within the required area around the neutral axis. Clearly other forms of constraining means could be used. Examples of these are the force of gravity, magnetic field, or air flow. The stylus support could be an air-bearing. The location of part of the sensing means away from the sensing space can reduce the size of the probe.

FIG. 3 shows an improved stylus form which can be used to improve the performance of the probe on certain surfaces, particularly smoothly-curving ones as are found on aerofoils or certain medical devices such as prostheses.

The stylus form shown in FIG. 3 can be arranged so that the part 70 can rotate on the stylus shaft as an axis. An accuracy of about 1 micron or better is preferred for the rotation of the part 70. This arrangement can greatly reduce drag at large angles of approach incidence, the part 70 rotating.

For simplicity FIG. 3 shows only the parts of FIG. 1 around the portion 43 together with the improved stylus 70 itself and a typical non-spherically curved object 80, such as part of a prosthesis for bone replacement. (The exact type of prosthesis is not relevant but such objects need to be measured very precisely and their non-spherical shape causes great problems for measurement.)

The improved stylus 70 replaces the conventional ball-ended type 41 mounted on portion 46 screwed into part 45. Stylus 70 is conveniently a knife-edged disc mounted so that the neutral axis passes through the plane of the disc at its centre. Suitable forms of construction and material will be apparent to those skilled in the art but an exemplary stylus can be turned from metal and the knife-edge hardened if required.

In use the stylus is fitted to replace the ball-end type and brought to touch the object to be measured. As before the deflection of the stylus which is determined by the comparator is that when the contact point of the stylus and an object to be measured is on the neutral axis of the stylus.

In the ball-ended stylus type the measurement varies as the contact point between the ball and the object moves over the surface of the ball. This variation is indicated by comparison of positions M1, M2 in FIG. 3. The geometry of the variation of measurement will be readily apparent. (The variation of course occurs even with the improved probe described herein when a conventional stylus is used.)

In distinction the knife edge of the improved stylus 70 shown in FIG. 3 does not suffer from the variation.

The probe is conveniently mounted on a precision coupling of known type in a co-ordinate measuring machine by which the probe can be moved from a position in which the neutral axis is vertical to one in which it is horizontal. In this way the two-dimensional action of the probe can be used for three-dimensional measurement.

The techniques described above provide an improved probe for co-ordinate measuring machines and, additionally, an improved stylus.

I claim:

1. A probe for a position-determining apparatus comprising:
    a housing and in the housing a sensing space and an aperture to the sensing space,
    a stylus extending out of the sensing space through said aperture,
    a low-friction stylus support means around said aperture, said low-friction stylus support including a plurality of balls spaced around the aperture;
    said stylus having a surface inside said sensing space which is at least partly spherical to move on said balls, means for constraining said stylus on to said support means, whereby the stylus is constrained to pivot in any direction about a fixed position point which is a center of curvature of the part-spherical surface, and constraining said stylus generally towards a neutral axis while permitting position-determining displacement on said support means against said constraining means, said constraining means being outside said sensing space, and a sensing means in said sensing space separate from the constraining means to sense directly significant movement of the stylus from said neutral axis without contact with the stylus and to indicate said significant movement of the stylus as a position-determining displacement.

2. A probe according to claim 1 in which the constraining means is a sheet of material.

3. A probe according to claim 1 in which the constraining means at least includes a resilient, flexible element.

4. A probe according to claim 2 in which the constraining means is wholly provided by a sheet of rubber across said aperture.

5. A probe according to claim 2 in which the constraining means is wholly provided by a sheet of resilient metal across said aperture.

6. A probe according to claim 1 in which the sensing means includes in said sensing space a source of light directed towards the stylus and the stylus carries a mirror to reflect light from the source back to the sensing means.

7. A probe according to claim 6 in which the amount of light received by the sensing means from the mirror varies in dependence on the displacement of the stylus.

8. A probe according to claim 7 in which the mirror is concave.

9. A probe according to claim 8 in which the source of light is one end of a flexible fibre optic extending from a radiator of light at the other end of the fibre optic remote from the probe.

10. A probe according to claim 9 in which the light reflected by the stylus mirror is collected by the or another fibre optic and carried to means to detect a change in the amount of light collected.

11. A probe according to claim 6 in which the sensing means includes means to compare the amount of light radiated from the radiator and the amount collected and determine, subject to compensation for the amount actually radiated, a change in the amount collected resulting from said significant movement of the stylus.

12. A probe according to claim 6 in which said sensing means includes means to determine the amount of deflection of said stylus from the movement of the position of the light reflected from the mirror.

13. A probe according to claim 12 including a beam splitter to direct light reflected from the mirror to a position detector.

14. A probe according to claim 1 the stylus having a disc-shaped, knife-edged part to touch an object to be measured.

15. A probe according to claim 1 in which said significant movement is that to displace to said neutral axis the part of the stylus in contact with an object to be measured.

* * * * *